United States Patent
Booth et al.

(10) Patent No.: US 9,624,782 B2
(45) Date of Patent: Apr. 18, 2017

(54) TEMPLATE FOR ALIGNING SURFACE FEATURES ON A ROTOR BLADE

(71) Applicant: General Electric Company, Schenectady, NY (US)

(72) Inventors: Michael Christopher Booth, Simpsonville, SC (US); Scott Gabell Riddell, Greer, SC (US); Megan Michela Wilson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 14/076,441

(22) Filed: Nov. 11, 2013

(65) Prior Publication Data

US 2015/0132135 A1 May 14, 2015

(51) Int. Cl.
*F01D 5/30* (2006.01)
*F03D 1/06* (2006.01)

(52) U.S. Cl.
CPC ............. *F01D 5/30* (2013.01); *F03D 1/0675* (2013.01); *F05B 2230/60* (2013.01); *F05B 2240/122* (2013.01); *F05B 2260/96* (2013.01); *Y02E 10/721* (2013.01); *Y02P 70/523* (2015.11); *Y10T 29/49316* (2015.01)

(58) Field of Classification Search
CPC . F03D 1/0675; F03D 1/0608; F05B 2240/122
See application file for complete search history.

(56) References Cited

U.S. PATENT DOCUMENTS

| | | | |
|---|---|---|---|
| 4,354,648 A | 10/1982 | Schenk et al. | |
| 6,105,904 A | 8/2000 | Lisy et al. | |
| 6,837,465 B2 | 1/2005 | Lisy et al. | |
| 7,909,576 B1 * | 3/2011 | van der Bos | F03D 1/0675 416/146 R |
| 7,914,259 B2 | 3/2011 | Godsk | |
| 8,038,396 B2 | 10/2011 | Anjuri et al. | |
| 8,047,801 B2 | 11/2011 | Fang et al. | |
| 8,506,250 B2 | 8/2013 | Bagepalli et al. | |
| 2003/0141721 A1 | 7/2003 | Bartlett | |
| 2008/0317600 A1 | 12/2008 | Enevoldsen et al. | |
| 2009/0087314 A1 | 4/2009 | Haag | |

(Continued)

FOREIGN PATENT DOCUMENTS

| | | |
|---|---|---|
| EP | 2484895 A1 | 8/2012 |
| WO | WO 00/15961 | 3/2000 |
| WO | WO 01/16482 | 3/2001 |

OTHER PUBLICATIONS

European Search Report and Written Opinion issued in connection with corresponding EP Application No. 14190403.7-1607 dated Mar. 19, 2015.

*Primary Examiner* — Igor Kershteyn
*Assistant Examiner* — Justin Seabe
(74) *Attorney, Agent, or Firm* — Dority & Manning, P.A.

(57) ABSTRACT

A rigid template for aligning surface features on a rotor blade is disclosed. The rigid template is shaped to correspond to the surface of the rotor blade. Further, the rigid template includes a base end and a tail end opposite the base end. The base end is configured to connect to an alignment structure, the alignment structure being fixed relative to the rotor blade. The tail end includes at least one marker configured to locate at least one surface feature on the surface of the rotor blade.

13 Claims, 7 Drawing Sheets

(56) References Cited

U.S. PATENT DOCUMENTS

2012/0134817 A1* 5/2012 Bagepalli ............ F03D 1/0675
　　　　　　　　　　　　　　　　　　　　　　416/62
2012/0151769 A1　6/2012 Brake et al.
2012/0282105 A1* 11/2012 Grife .................... F03D 1/0675
　　　　　　　　　　　　　　　　　　　　　　416/228

* cited by examiner

TEMPLATE FOR ALIGNING SURFACE FEATURES ON A ROTOR BLADE

FIELD OF THE INVENTION

The present invention relates generally to the field of wind turbines, and more particularly to a template for aligning surface features on a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

It is known in the art to change the aerodynamic characteristics of wind turbine blades by adding dimples, protrusions, or other structures on the surface of the blade. These structures are often referred to as "vortex generators" and serve to create local regions of turbulent airflow over the surface of the blade as a means to preclude flow separation and thus optimize aerodynamic airflow around the blade contour. Conventional vortex generators typically consist of a base having one or more raised surfaces and are attached to the suction side of the blade using an adhesive, such as glue.

It is important to properly align vortex generators on the surface of the rotor blade in order to obtain the desired air flow characteristics. As such, installation accounts for much of the time and cost associated with these features. One conventional installation method includes soft templates that are typically taped to the surface of the rotor blade to align the vortex generators and other various surface features. These soft templates, however, are associated with numerous installation issues. For example, the soft templates may acquire wrinkles or tears during installation and/or removal causing misaligned vortex generators. Moreover, the soft templates may become misplaced due to environmental conditions, such as being blown off of the surface of the blade via the wind. Additionally, the soft templates are difficult to reuse on multiple blades.

Another conventional installation method includes manually measuring and aligning the vortex generators using string lines. Such a method, however, is associated with numerous installation issues. For example, manually measuring and aligning the vortex generators can take many hours to complete and may lead to operator errors and/or inconsistencies between different operators.

Accordingly, the industry would benefit from an improved template for aligning surface features on the surface of a rotor blade. More specifically, a rigid template that addresses at least the aforementioned problems and decreases installation time and cost would be advantageous.

BRIEF DESCRIPTION OF THE INVENTION

Aspects and advantages of the invention will be set forth in part in the following description, or may be obvious from the description, or may be learned through practice of the invention.

In accordance with aspects of the invention, a rigid template for aligning surface features on a rotor blade of a wind turbine is disclosed. The rigid template includes a rigid body shaped to correspond to a surface of the rotor blade. The rigid body includes a base end and a tail end opposite the base end. The base end is configured to connect to an alignment structure of the rotor blade, the alignment structure being fixed relative to the rotor blade. The tail end includes at least one marker configured to locate at least one surface feature on the surface of the rotor blade.

In yet another aspect, a method for aligning surface features on a surface rotor blade of a wind turbine is disclosed. The method includes locating an alignment structure on the rotor blade, the alignment structure being fixed relative to the rotor blade; connecting a rigid template to the alignment structure, the rigid template comprising at least one marker configured to locate at least one surface feature on the surface of the rotor blade; removing the rigid template from the surface of the rotor blade; and, securing the at least one surface feature on the surface of the rotor blade corresponding with the at least one marker.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
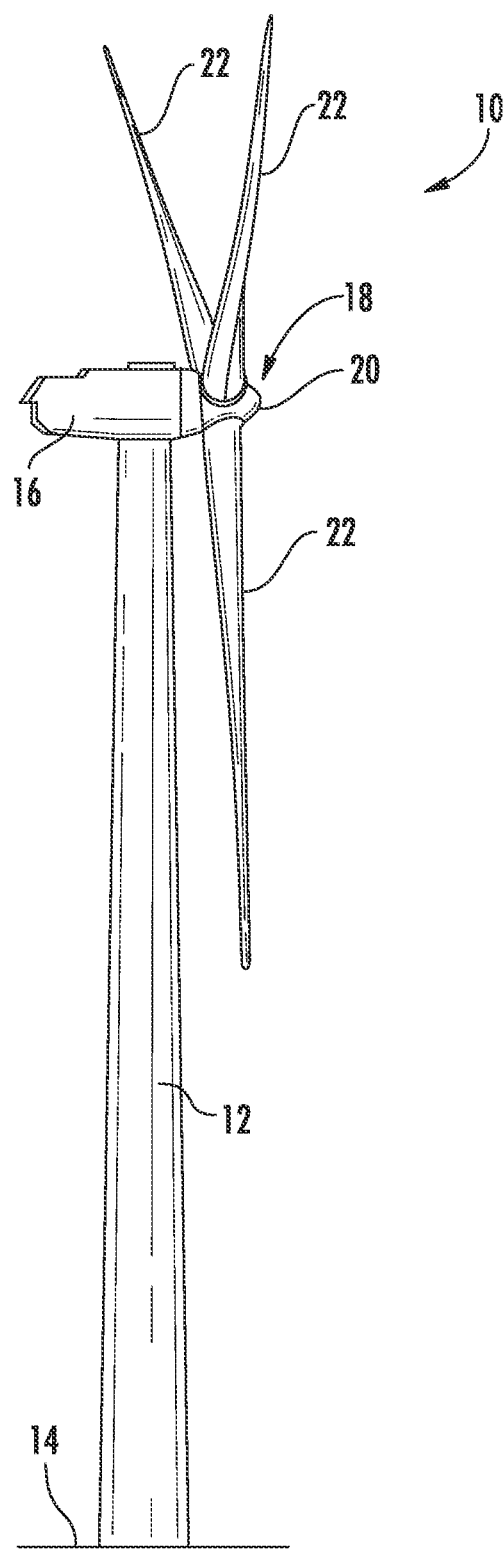
FIG. 1 illustrates a perspective view of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

The present invention is described herein as it may relate to a wind turbine blade. It should be appreciated, however, that the unique system and method in accordance with principles of the invention is not limited to use on wind turbine blades, but is applicable to any type of airfoil or flow surface that would benefit from the invention. Examples of such surfaces include airplane wings, boat hulls, sails, and so forth.

Generally, the present disclosure is directed to a rigid template for aligning surface features on a surface of a rotor blade of a wind turbine. The rigid template has a rigid body comprising a base end and a tail end. The rigid body may be shaped to correspond to the surface of the rotor blade or may be flexible enough to curve with the surface of the rotor blade. As such, the term "rigid" as used herein is meant to encompass a template that is not easily bent and/or manipulated as well as a template that is flexible enough to curve with the blade without wrinkling, tearing, or becoming misaligned. Accordingly, the rigidity of the template may be a product of the template's thickness and/or materials of construction. The base end of the template is configured to connect with an alignment structure of the rotor blade, such as a pitch flange of a pitch bearing or a trailing edge of the rotor blade. Further, the rigid template includes at least one marker configured to locate at least one surface feature on the surface of the rotor blade.

It should be understood that the term "surface feature" as used herein may include any feature that can be added to the surface of a rotor blade. For example, in one embodiment, the surface features may be airflow modifying elements, such as vortex generators, dimples, protrusions, and/or other similar features on the surface of the blade. In another embodiment, the surface features may include at least one tuft or stall flag. In still further embodiments, the surface features may be any suitable surface feature known in the art. Further, the rigid template as described herein may be used to align any number of surface features, from one to more than one. Additionally, the surface features described herein may have any suitable shape configuration within the scope and spirit of the invention. For example, the surface features may have a fin, wedge-type, or any other suitable shape known in the art.

The rigidity of the template provides various advantages. For example, due to the rigidity, the template can be used to quickly and precisely locate surface features on the surface of the rotor blade without wrinkling or tearing during installation and/or removal. As such, the system and method described herein provides a significant decrease in installation time and cost. Further, the rigid template can be easily reused on multiple blades. Moreover, the rigid template may be constructed of a plurality of rigid template segments such that the various segments can easily be lifted uptower without the use of costly cranes.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
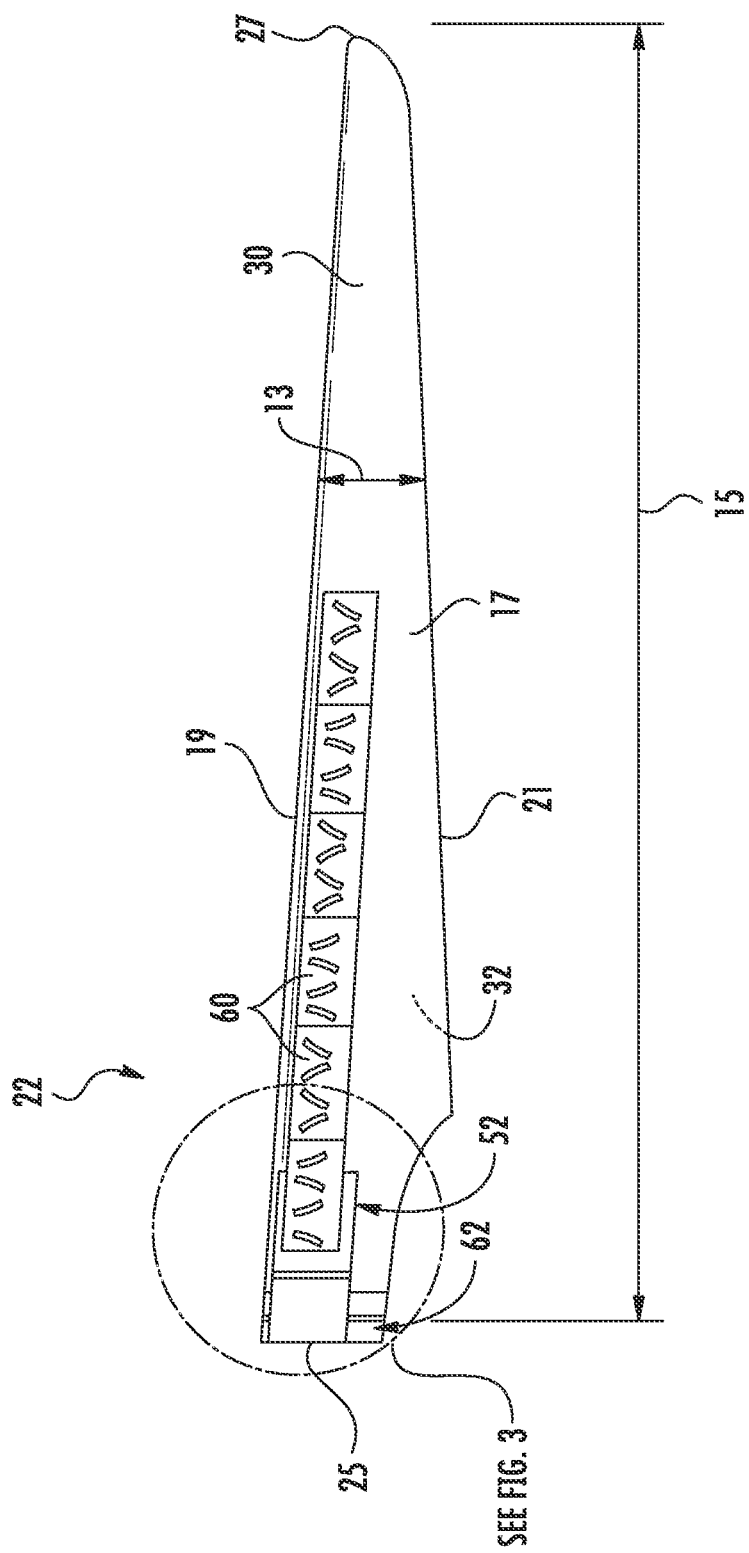
FIG. 2 illustrates a perspective view of a rotor blade including one embodiment of a rigid template for aligning surface features on a surface of the rotor blade according to the present disclosure.

Referring now to FIG. 2, a perspective view of a rotor blade 22 including one embodiment of a system 50 for aligning surface features 60 on a surface of a rotor blade 22 according to the present disclosure is illustrated. As shown, the rotor blade 22 generally includes a blade root 25 configured to be mounted or otherwise secured to the hub 20 (FIG. 1) of the wind turbine 10 and a blade tip 27 disposed opposite the blade root 25. A body shell 17 of the rotor blade 22 generally extends between the blade root 25 and the blade tip 27. The body shell 17 may generally serve as the outer casing/covering of the rotor blade 22 and may define a substantially aerodynamic profile, such as by defining a symmetrical or cambered airfoil-shaped cross-section.

The body shell 17 may also define a pressure side surface 30 and a suction side surface 32 extending between a leading edge 19 and a trailing edge 21 of the rotor blade 22. Further, the rotor blade 22 may also have a span 15 defining the total length between the blade root 25 and the blade tip 27 and a chord 13 defining the total length between the leading edge 19 and the trailing edge 21. As is generally understood, the chord 13 may generally vary in length with respect to the span 15 as the rotor blade 22 extends from the blade root 25 to the blade tip 27. Further, "span-wise" is generally understood to mean substantially parallel to the span 15 of the rotor blade 22, whereas "chord-wise" is generally understood to mean substantially parallel the chord 13 of the rotor blade 22.

Figure 3:
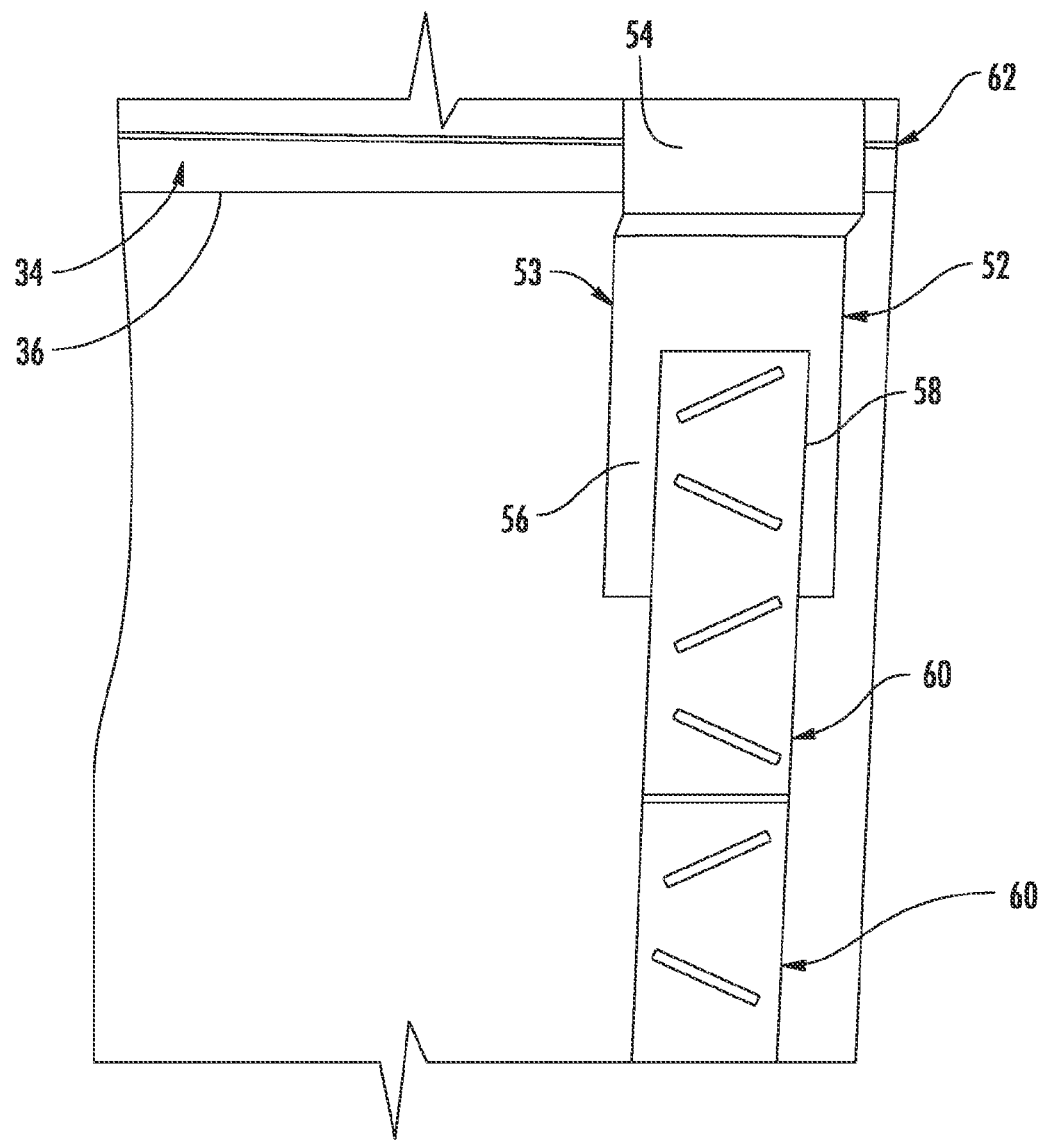
FIG. 3 illustrates a close-up perspective view of the rigid template of FIG. 2.

Referring now to FIG. 3, the rigid template 52 may have a rigid body 53 with a base end 54 and a tail end 56 opposite the base end 54. The base end is configured to connect to an alignment structure 62 fixed relative to the rotor blade 22. For example, in the illustrated embodiment, the alignment structure 62 is a pitch flange 36 of a pitch bearing 34. As such, the rigid template 52 is configured to extend span-wise along the surface of the rotor blade 22 from the base end 54 at the pitch flange 36 to the tail end 56 when aligned with the alignment structure 62.

The rigid template 52 may further include at least one marker 58 configured to locate one or more surface features 60. For example, as illustrated in FIG. 3, the marker 58 includes a cut-out. As such, the cut-out may be configured for receipt of at least one surface feature 60. Alternatively, the cut-out may be used as a stencil such that the desired location of the surface feature 60 may be marked and later installed. In addition, the cut-out may be used for a stencil for paint removal or a mask for pre-treatment before a surface feature or an add-on is installed on the surface of the blade 22.

It should also be understood by those skilled in the art that the rigid template as described herein is not limited to aligning surface features, but may also serve a variety of additional functions. For example, the markers on the rigid template may also serve as pre-cut markers for tuft locations. Additionally, the rigid template may be used to provide accurate reference locations for blade damage. As such, the rigid template may also include a ruler or scale to assist in locating blade damage, thereby providing a means for accurately locating locate blade damage and cataloging issues associated with multiple rotor blades.

The alignment structure 62 may be any fixed structure relative to the rotor blade 22, whether an integral part of the rotor blade 22 or a separate structure installed on the rotor blade 22. For example, the alignment structure 62 may include a root band, the blade root 25, the trailing edge 21, or similar. The root band as disclosed herein is any suitable band or feature installed and fixed on the rotor blade 22 so as to assist with aligning the rigid template 52. Further, the root band may be a rigid or flexible band, having any suitable shape, and may be made of any suitable material. For example, the root band may be installed circumferentially around the chord 13 of the rotor blade 22 near the blade root 25 or near the blade tip 27. Further, the rotor blade 22 may be manufactured to include a raised or grooved alignment structure 62. Moreover, the alignment structure 62 may be located at any location on the rotor blade 22. For example, the alignment structure 62 may be located near the blade root 25 or may be located near the blade tip 27. Another advantage of using the alignment structures 62 as described herein is having a fixed reference location for connecting the rigid template 52, thereby properly aligning the surface features 60 on the blade 22.

Figure 4:
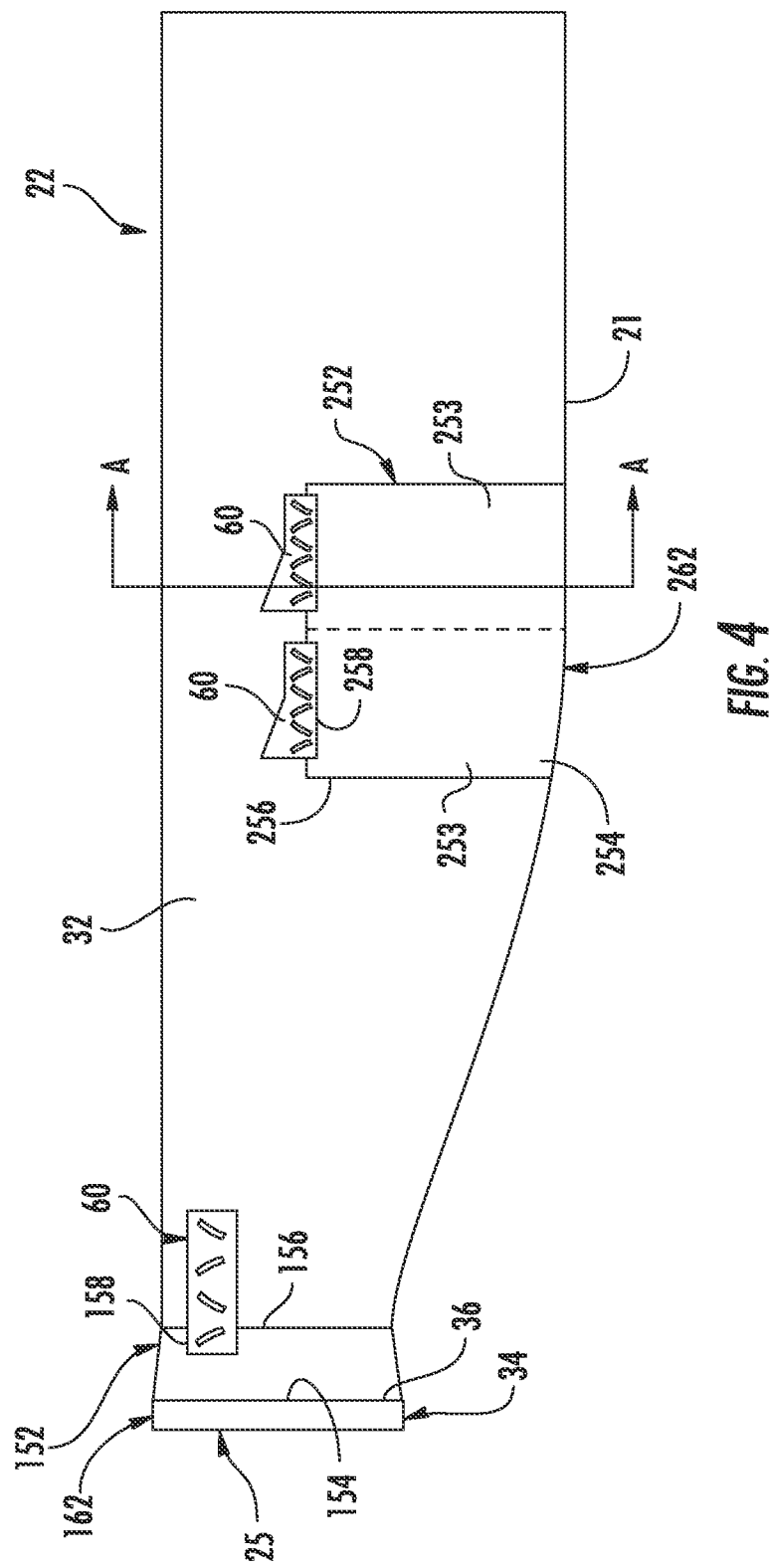
FIG. 4 illustrates a partial-perspective view of a rotor blade including various embodiments of a rigid template for aligning surface features on a surface of the rotor blade according to the present disclosure.

Referring now to FIG. 4, additional embodiments of the rigid templates 152, 252 are illustrated. In the depicted embodiment, rigid template 152 is aligned with alignment structure 162 near the blade root 25 (i.e. corresponding to the pitch flange 36 of the pitch bearing 34). As such, the rigid template 152 is configured to extend span-wise along the surface of the rotor blade 22 from the base end 154 to the tail end 156 when aligned with the pitch flange 36. Alternatively, the rigid template 252 may be aligned with alignment structure 262 corresponding to the trailing edge 21 of the rotor blade 22. As such, the rigid template 252 is configured to extend chord-wise along the surface of the rotor blade 22 from the base end 254 to the tail end 256 when aligned with the trailing edge 21.

It should be understood by one or ordinary skill in the art that the rigid template may be located at any location on either or both of the rotor blade's flow surfaces 30, 32. For example, as illustrated in FIG. 4, the rigid template 152, 252 is installed on suction side surface 32 of rotor blade 22. In another embodiment, the rigid template may also be provided on the pressure side surface 30. Further, the rigid template may be shaped to correspond to any surface of the rotor blade 22. For example, as shown in FIG. 3, the rigid template 52 has a generally rectangular shape and a profile that corresponds with the surface of the rotor blade 22. Alternatively, the rigid template 152 may have a generally circular shape such that it may be installed around the blade root 25 (FIG. 4). The rigid template 152 also includes cut-out 158 within the tail end 156 configured for receipt of the surface feature 160. Additionally, in a further embodiment, the rigid template may be shaped to connect to the alignment structure such that the shape of the rigid template holds the rigid template to the surface of the blade. More specifically, the rigid template may be shaped to connect over the pitch flange 36 of the pitch bearing 36 (FIG. 3). In still further embodiments, the rigid template may be optionally and temporarily held in place on the surface of the blade with an adhesive, such as adhesive tape, glue, or any other suitable adhesive known in the art.

Still referring to FIG. 4, in a further embodiment, the rigid template 252 may include a plurality of rigid template segments 253 as indicated by the dotted line. For example, as shown, the rigid template 252 includes two rigid template segments 253. In additional embodiments, the rigid template 252 may include more than two or less than two rigid template segments 253. Each segment 253 may be designed such that it aligns and/or connects with another segment 253. Additionally, each segment 253 may be numbered such than an operator can quickly and easily install each segment 253 in a predetermined order. As mentioned, providing a segmented rigid template 252 allows for easy installation uptower of the wind turbine 10 without the use of costly cranes. Further, the segments 253 may be easier for an operator to handle in comparison to a single, larger template.

Figure 5:
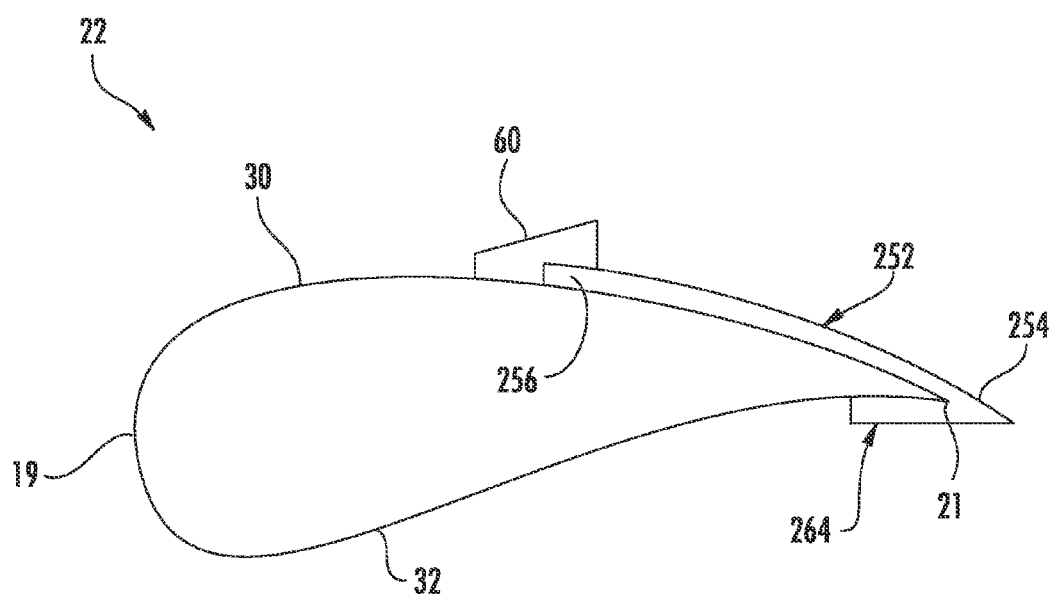
FIG. 5 illustrates a cross-section of the rotor blade of FIG. 4 along line A-A.

Referring now to FIG. 5, an aerodynamic cross-section of the rotor blade 22 of FIG. 4 along line A-A is illustrated. As shown, the rigid template 252 has a base end 254 and a tail end 256. In the illustrated embodiment, the base end 254 includes an extension portion 264 configured to fit around the trailing edge 21 of the rotor blade 22. As such, the extension portion 264 is capable of temporarily securing the rigid template 252 to the rotor blade 22 while the template is being used, thereby further preventing shifting of the template and subsequent misalignment of the surface features. The extension portion 264 also provides for simple removal of the template from the rotor blade 22 when use of the template is complete.

Figure 6:
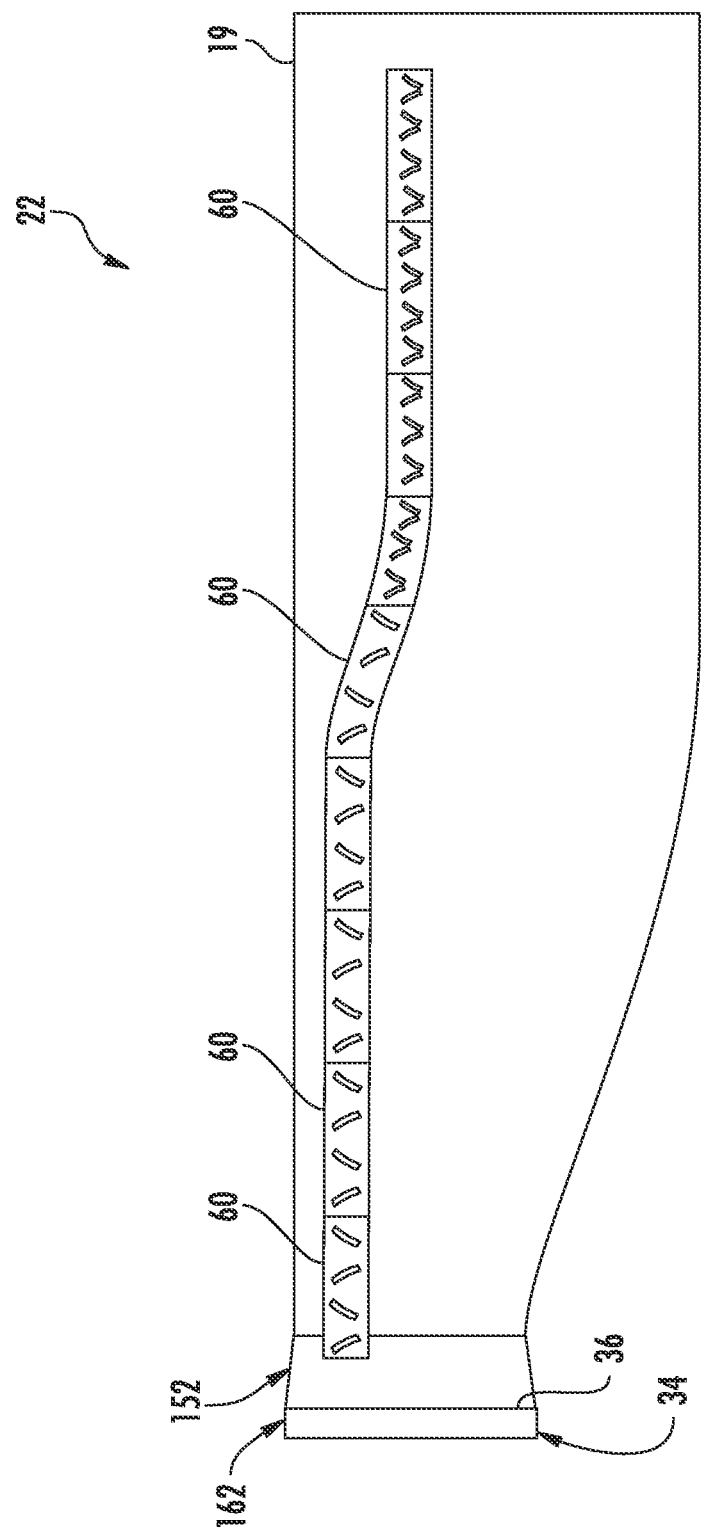
FIG. 6 illustrates a perspective view of a rotor blade including another embodiment of a rigid template for aligning surface features on a surface of the rotor blade according to the present disclosure; and, FIG. 7 illustrates one embodiment of a method for aligning surface features on a surface of a rotor blade according to the present disclosure.

Referring now to FIG. 6, another perspective view of the rotor blade 22 of FIG. 4 including a plurality of surface features 60 attached thereto is illustrated. As shown, the rigid template 152 is aligned with alignment structure 162 (i.e. corresponding to the pitch flange 36 of the pitch bearing 34). The rigid template 152 includes cut-out 158 configured for receipt of surface feature 60. A plurality of surface features 60 are connected in series to the first surface feature 60 such that each of the surface features 60 is properly aligned on the surface of the rotor blade 22. For example, as shown in the illustrated embodiment, the plurality of surface features 60 are designed and shaped such that at least a portion of the surface features 60 are parallel with the leading edge 19 of the rotor blade 22 when installed using the rigid template 152.

It should be understood that the rigid template may be manufactured using any suitable means and materials known in the art. For example, in one embodiment, the rigid template can be manufactured using injection molding using the surface of the rotor blade as a mold. In addition, the rotor blade itself can be used as a fiberglass mold for the rigid template. Further, the rigid template may be constructed of any suitable material so as to provide the appropriate functions as described herein. For example, the rigid template may be constructed of plastic, thermoplastic, composite, fiberglass, elastomer, metal, or similar and any combinations thereof. Further, the rigid template may have any suitable thickness so as to provide the appropriate rigidity. For example, in one embodiment, the template has a thickness ranging from about 1 millimeter (mm) to about 5 mm. Alternatively, at least a portion of the rigid template may have a thickness of less than 1 mm, such that it is moldable against a surface of the rotor blade. In still another embodiment, at least a portion of the template may have a thickness of more than 5 mm. In such an embodiment, the rigid template may be pre-shaped so as to conform with the surface of the rotor blade.

In addition, at least a portion of the rigid template may include a translucent material having a grid. As such, in a further embodiment, the rigid template can be used to provide accurate reference locations for surface features and/or blade damage. Further, as mentioned, the rigid template may include a ruler or scale for accurately defining a location of a surface feature and/or blade damage. Accordingly, the location can be located directly on the translucent rigid template. The locations can then be used to create a damage library or catalog, wherein blade damage issues can be recorded based on the marked location on the rigid template (e.g. template segment number, chord-wise position, span-wise position, etc.).

Figure 7:
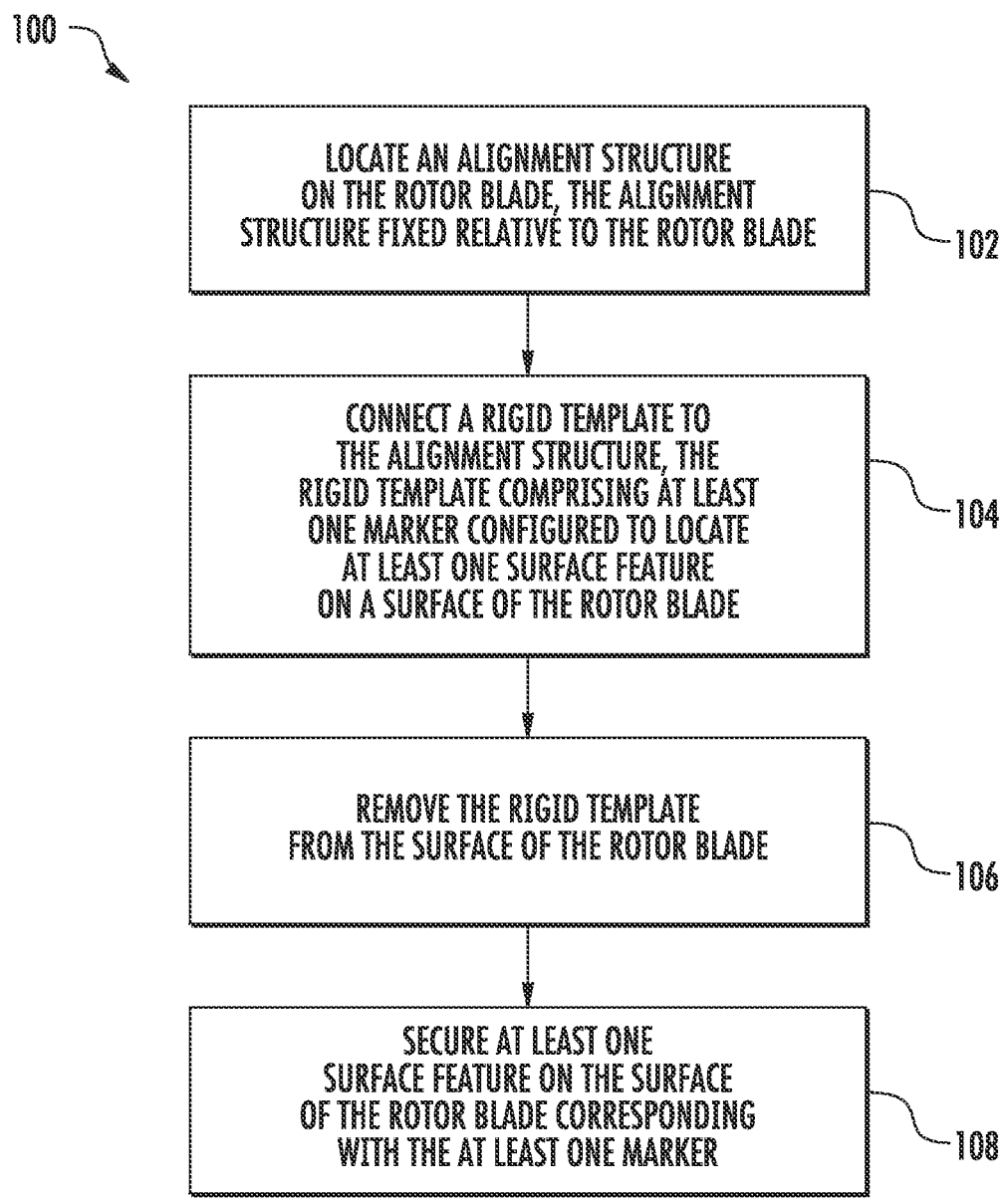

Referring now to FIG. 7, the present invention also includes a method 100 for aligning surface features on a surface of the rotor blade 22. The method 100 includes a step 102 of locating an alignment structure on the rotor blade, the alignment structure being fixed relative to the rotor blade. The method 100 may also include connecting (step 104) a rigid template to the alignment structure, the rigid template including at least one marker configured to location at least one surface feature on the surface of the rotor blade. In addition, the step of connecting the rigid template (step 104) may further include connecting a plurality of rigid template segments together to form the rigid template. In one embodiment, the rigid template segments may be numbered such that they are connected in a predetermined order. The method 100 may also include a further step 106 of securing the at least one surface feature on the surface of the rotor blade corresponding with the at least one marker. The step of securing 106 may further include using an adhesive, a fastening member, or similar. The method 100 may also include removing (step 108) the rigid template from the surface of the rotor blade. In a further embodiment, the step of removing 108 may be completed after the surface features are secured to the rotor blade 22. As such, when the rigid template is removed from the surface of the rotor blade, the one or more surface features remain in the proper location on the surface of the blade. Alternatively, the step of removing 108 may be completed before the surface features are secured to the rotor blade 22. As such, the rigid template may be used a marker and the method may further include marking the location of the surface features prior to removal of the template.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. As mentioned, it should also be appreciated that the invention is applicable to any type of flow surface, and is not limited to a wind turbine blade. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rigid template for aligning surface features on a rotor blade of a wind turbine, the rotor blade defining a surface, at least one surface feature, a pitch flange, a blade root, a blade tip, a leading edge, and a trailing edge, the rigid template comprising:
    a rigid body shaped to correspond to the surface of the rotor blade, said rigid body comprising a base end connected to the pitch flange at the blade root of the rotor blade and a tail end opposite the base end, wherein the rigid body extends span-wise or chord-wise along the surface of the rotor blade from the base end to the tail end
    said tail end comprising at least one marker configured to locate at least one surface feature on the surface of the rotor blade.

2. The rigid template of claim 1, wherein the base end of the rigid body is connected to the trailing edge of the rotor blade.

3. The rigid template of claim 1, wherein said base end further comprises an extension portion configured to fit around the trailing edge of the rotor blade.

4. The rigid template of claim 1, further comprising a plurality of rigid template segments.

5. The rigid template of claim 1, wherein the at least one marker comprises at least one cut-out, said at least one cut-out configured to align the at least one surface feature of the rotor blade.

6. The rigid template of claim 1, wherein said rigid template comprises at least one of the following materials: a plastic, a thermoplastic, a composite, a fiberglass, an elastomer, or a metal.

7. A method for aligning surface features on a rotor blade of a wind turbine, the rotor blade defining a surface, at least one surface feature, a pitch flange, a blade root, a blade tip, a leading edge, and a trailing edge, the method comprising:
    locating the pitch flange at the blade root on the rotor blade;
    connecting a rigid template to the pitch flange at the blade root, the rigid template comprising at least one marker configured to locate at least one surface feature on the surface of the rotor blade;
    removing the rigid template from the surface of the rotor blade; and,
    securing the at least one surface feature on the surface of the rotor blade corresponding with the at least one marker.

8. The method of claim 7, wherein the step of connecting the rigid template to the alignment structure further comprises connecting a plurality of rigid template segments together.

9. The method of claim 7, wherein said rigid template extends span-wise along the surface of the rotor blade from a base end to a tail end when connected with the pitch flange.

10. The method of claim 7, further comprising installing an extension portion of said base end around the trailing edge of the rotor blade.

11. The method of claim 7, wherein the at least one marker comprises a cut-out, said cutout configured to align the at least one surface feature.

12. The method of claim 7, wherein the surface features comprise at least one airflow modifying element, the at least one airflow modifying element comprising at least one vortex generator.

13. The method of claim 7, wherein said rigid template comprises at least one of the following materials: a plastic, a thermoplastic, a composite, a fiberglass, an elastomer, or a metal.

* * * * *